United States Patent [19]

Denz et al.

[11] Patent Number: 4,995,365
[45] Date of Patent: Feb. 26, 1991

[54] SYSTEM FOR DETECTING ENGINE IGNITION FAILURES IN AN INTERNAL COMBUSTION ENGINE

[75] Inventors: Helmut Denz, Stuttgart; Werner Herden, Gerlingen, both of Fed. Rep. of Germany

[73] Assignee: Robert Bosch GmbH, Stuttgart, Fed. Rep. of Germany

[21] Appl. No.: 453,403

[22] Filed: Dec. 19, 1989

[30] Foreign Application Priority Data

Feb. 7, 1989 [DE] Fed. Rep. of Germany ....... 3903566

[51] Int. Cl.⁵ .............................................. F02M 51/00
[52] U.S. Cl. ..................................... 123/479; 324/399; 364/431.07
[58] Field of Search ................ 123/479, 630, 640, 480, 123/489, 494, 425, 435, 594, 198 D; 364/431.07, 431.11

[56] References Cited

U.S. PATENT DOCUMENTS 4,704,685 11/1987 Martinsons et al. ............ 364/431.11
4,821,194 4/1989 Kawamura ....................... 364/431.08
4,918,389 4/1990 Schleupen et al. ................. 324/399

Primary Examiner—Raymond A. Nelli
Attorney, Agent, or Firm—Frishauf, Holtz, Goodman & Woodward

[57] ABSTRACT

A microphone serving as a pressure gradient sensor is connected by a pressure transmission tube to the collecting duct of the exhaust manifold of an internal combustion engine for detecting the pressure shock waves released by the opening of the exhaust valves of the engine when combustion occurs in the respective cylinders. An evaluation circuit connected to the sensor detects when such a pressure wave is missing, indicating a failure of ignition in the cylinder and reports the cylinder in which such failure occurs. The system has the advantage that failure of the fuel to ignite is detected and when there is a normal spark. The counter in the evaluation system identifies the cylinder when a failure has occured. The sensor can be disconnected under control of the crankshaft or the camshaft from the evaluation circuit except during brief intervals beginning just before an exhaust valve opens, in order to improve reliability.

18 Claims, 1 Drawing Sheet

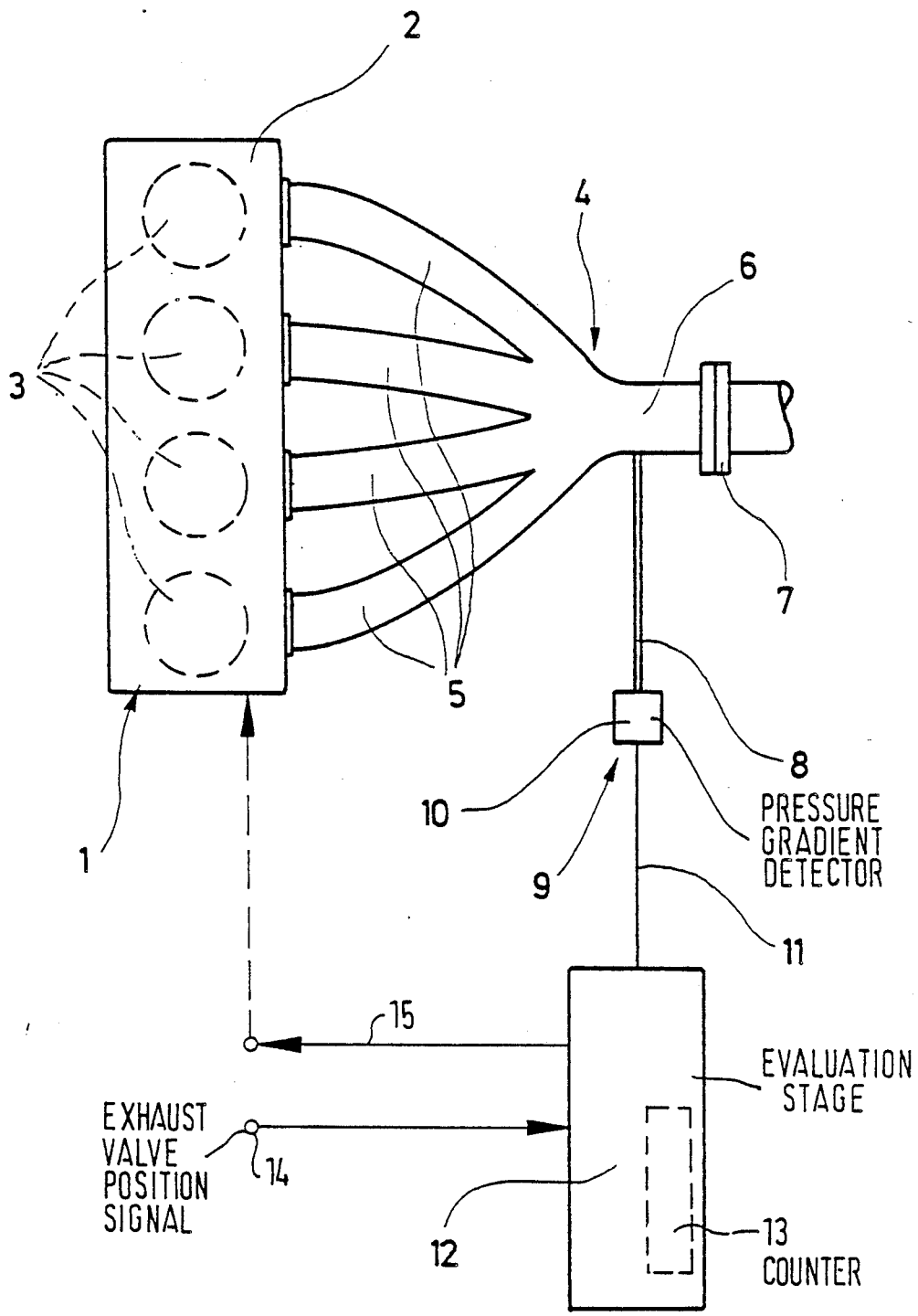

SYSTEM FOR DETECTING ENGINE IGNITION FAILURES IN AN INTERNAL COMBUSTION ENGINE

This invention concerns detection of ignition failures in an internal combustion engine cylinder, particularly in four-stroke (Otto) motors, with the assistance of an evaluation circuit connected to a detector.

Such devices and systems are used to detect ignition failures in order to initiate or suggest measures for protection of the engine of its components against damage. It is for example useful to interrupt the supply of fuel to an internal combustion engine when ignition failures occur in order to avoid flooding the engine with fuel. When the matter is completely considered, it is found important to avoid damage to catalysts resulting from the presence of unburned fuel in the exhaust gas where the catalysts are used to treat the gas.

It is known in automative technology to detect ignition failures by monitoring the ignition voltage or the ignition current to find abnormalities therein. This method of detection has the disadvantage that sparks jumping in the ignition system outside of the combustion chambers of the internal combustion engine lead to detection of ostensible ignition currents which will be interpreted as trouble-free ignition. In consequence the known apparatus of this kind does not detect all cases of failure.

It is also known to provide one or more λ-probes for monitoring the ignition state of the internal combustion engine. Ignition failures lead to a change of the composition of the exhaust gas which can be recognized by the λ-probe. Still other known methods consist of evaluating signals from combustion chamber sensors in each cylinder. The disadvantage of such solutions of the problem is the relatively high price.

SUMMARY OF THE INVENTION

It is an object of the invention to provide detection of ignition failures in an internal combustion engine in a manner which is free of the disadvantages above-described which are found in the known systems of detection.

Briefly, one or more pressure gradient sensor(s) is (are) provided downstream of the exhaust valves of the cylinders of the engine and the output of the sensor(s) is (are) connected to an evaluation circuit. The pressure gradient sensor can advantageously be constructed as a microphone and can be mounted in a pressure transmission tube connected to the collecting tube of an exhaust gas manifold of the engine.

The system of the invention has the advantage that in fact only combustion failures are recognized, which signifies that sparks occurring outside of the combustion chamber do not lead to any response of the detector. Not only the malfunctions resulting from absence of ignition sparks are recognized, but also occurrences of sparks which fail to ignite combustion (for example for lack of fuel, resulting from defective fuel supply). By provision of a pressure gradient sensor downstream of the exhaust valve of every cylinder, the detection of ignition failures results from interpretation of the acoustic phenomena of the engine. In other words, when the exhaust valve opens the pressure difference between the combustion chamber and the exhaust outlet system produces a shock wave, which is generally audible as a "bang" when the muffler in the system is defective, and that shock wave is now observed by the detector and evaluated. When ignition fails, for example, because of failure of the electrical ignition system, this pressure shock is missing or at any rate it does not have the usual intensity. The the detector constructed as a pressure gradient sensor can therefore unambiguously detect the ignition failure by detecting the pressure wave deficiency.

Construction of the pressure gradient sensor as a microphone provides an economical sensor and assures rapid response.

In a preferred embodiment the pressure gradient sensor is located in the collecting tube of the exhaust manifold of the engine. In this embodiment the acoustic phenomena accompanying the opening of the exhaust valves of all the respective cylinders of the engine are sensed at one location, so that only one detector is necessary. It is basically also possible, as an alternative, to provide a pressure gradient sensor for each cylinder.

For decoupling of mechanical noise and for mitigation of the incidence of temperature stresses on the pressure gradient sensor, mounting of the sensor in a pressure transmission tube is advantageous. Such a tube connects at one end to the exhaust manifold of the engine and at the other end leads to the pressure gradient sensor. A relatively thin tube that is connected to the exhaust manifold on the principle of a stethoscope can be used for the pressure transmission tube. The acoustic bang of the opening of the exhaust valve is transmitted through the pressure transmission tube to the pressure gradient sensor. The pressure gradient sensor is thus located at a sufficient spacing from the exhaust manifold to assure that its position is non-critical.

In an elaboration of the invention, it is possible, with some advantage, to interrogate or observe the output of the pressure gradient sensor only in time intervals in which an exhaust valve opens, as determined and controlled by the crankshaft or camshaft for synchronously making the sensor output observable. This provision permits unambiguous determination whether the acoustic event is missing in a particular cylinder, since for each individual cylinder a moment of ignition is ascertainable with reference to the corresponding position of the crankshaft and camshaft, and likewise the moment of opening of the exhaust valve. Accordingly an unambiguous determination is possible not only regarding whether combustion has or has not taken place at a particular time, but even whether a disturbance or malfunction is indicated as occurring in a particular cylinder. In multi-cylinder engines it is preferable, according to the invention, to provide an evaluation circuit having a detector-controlled counting circuit for identifying the individual cylinder being observed. A simple counting circuit is sufficient for recognizing the individual cylinders.

It is also preferable that when ignition failures occur the evaluation circuit should switch off fuel injection to the cylinder in question and/or activate a notification signal.

BRIEF DESCRIPTION OF THE DRAWINGS

The invention is further described by way of illustrative example with reference to the annexed drawing, the single FIGURE of which is a schematic view of the engine block and part of the exhaust system of a four-cylinder internal combustion engine, to the exhaust manifold of which a pressure gradient sensor is connected by means of a pressure transmission tube.

DESCRIPTION OF THE ILLUSTRATED EXAMPLE

The internal combustion engine 1 shown in the drawing has an engine block 2 which contains 4 individual cylinders 3. The exhaust valves (not shown) of the individual cylinders 3 open into an exhaust manifold 4. The individual manifold pipes 5 coming from the cylinders 3 all lead into a collecting tube or duct 6 of the manifold 4. The collecting tube 6 is connected by a flange connection 7 to the exhaust system, not shown, of the engine 1, which may include a muffler and a catalytic converter, for example, as well as additional piping.

A pressure transmission tube 8 is connected at one end to the collecting tube 6 of the exhaust manifold 4 and leads to a detector 9 which is constituted in the form of pressure gradient sensor 10. Preferably a microphone is used as the pressure gradient sensor 10 through which the wide frequency spectrum of an acoustic event occuring after successful ignition and released when the exhaust valve of one of the cylinders opens can be registered with low cost and likewise thereafter evaluated. A relatively thin metal tube can be used as the pressure transmission tube 8 and may be additionally decoupled from the exhaust manifold by suitable means (not shown) so that practically no solid conduction of mechanical noise occurs. The acoustic event is therefore predominantly transmitted through the gas medium located within the exhaust manifold 4 and the pressure transmission tube 8.

The pressure gradient sensor 10 is connected through an electrical connection line 11 to an evaluation stage 12 which contains corresponding electronic circuitry and, if the engine is equipped with fuel injection for the individual cylinders, may advantageously have an output connected with the fuel injection system.

The evaluation stage 12 contains a schematically represented counter circuit 13, by the use of which the output of the pressure gradient sensor 10 can be interrogated over the line 11 in synchronism with the crankshaft or camshaft during the time intervals in which the exhaust valves of the respective individual cylinders 3 open or are open. In this connection it is likely that account should be taken of the propagation time of the pressure wave from the exhaust valve to the pressure gradient sensor. It is advantageous to define the speed dependent angular sector (of crankshaft rotation) for each cylinder in which the signal at the terminal 14 can best be evaluated separately for each cylinder.

During the operation of the engine 1 the exhaust valves belonging to the respective cylinders 3 of the engine open in a rhythm corresponding to the engine speed. In consequence the pressure difference arising at each combustion event between the corresponding combustion chamber and the region downstream of the exhaust valve produces a pressure shock wave when the valve opens that is guided through the exhaust manifold 4 and the pressure transmission tube 8 to the pressure gradient sensor 10 and there registered. Whenever an ignition system failure is present or for any other reason no combustion takes place, the above-described pressure wave is missing, so that the pressure gradient sensor 10 then makes no corresponding signal.

The omission of such a signal is registered by the evaluation stage 12, which then initiates such measures as are suitable for the case of the particular engine. For example it is possible to interrupt, by a signal on the output line 15, a fuel supply to the entire engine or even to the particular cylinder in some cases.

By virtue of the interrogation or observation of the pressure gradient sensor 10 in a manner synchronous with the crankshaft or the camshaft rotation in the engine, in the intervals in which the various exhaust valves are open, pressure waves from every individual cylinder can be identified by means of the counter circuit 13 of the evaluation circuit 12, so that when a malfunction occurs a particular cylinder in which it occurs can be identified. It is then possible to provide a report signal identifying the cylinder in question or in some cases, for example, the cylinder can be disabled by interruption of fuel injection thereto or the like, without necessarily stopping the engine.

Although the invention has been described with reference to a particular illustrative example, it will be recognized that modifications and variations are possible within the inventive concept.

We claim:

1. Apparatus for detecting ignition failures in an internal combustion engine having a plurality of cylinders for internal combustion, exhaust valves for each of said cylinders and an exhaust manifold having a collecting tube and connections thereof to each of said exhaust valves, said apparatus comprising:

a pressure gradient sensor means (10), exposed to pressure prevailing inside said exhaust manifold and to pressure gradients passing downstream of said exhaust valves, for sensing pressure shock waves generated by opening of said exhaust valves without regard to slower fluctuations of pressure in said manifold; and an evaluation stage (12) electrically connected to said pressure gradient sensor means and having means for detecting and reporting a pressure wave deficiency relating to the opening of any of said exhaust valves.

2. The apparatus of claim 1, wherein said pressure gradient sensor means is an acoustic wave sensor, constructed as a microphone.

3. The apparatus of claim 1, wherein said pressure gradient sensor means (10) is mounted so as to respond to pressure gradients of acoustic waves in said collecting tube (6) of said exhaust manifold (4).

4. The apparatus of claim 1, wherein said pressure gradient sensor means (10) is connected by a gas pressure wave transmission tube (8) to the space inside said collecting tube (6) of said exhaust manifold (4) for decoupling said pressure gradient sensor means (10) from mechanical noise transmitted in the solid structure of said exhaust manifold (4).

5. The apparatus of claim 1, further comprising means for making the output of said pressure gradient sensor means available to said evaluation stage only at time intervals including the opening of a said exhaust valve, and means for determining said time intervals under control of a rotary shaft of said engine.

6. The apparatus of claim 1, wherein said evaluation stage is equipped with means for identifying the cylinder to which each reported pressure wave deficiency is related.

7. The apparatus of claim 6, wherein means are provided for shutting off fuel injection to a said cylinder designated by said identifying means as related to a said pressure wave deficiency.

8. Apparatus for detecting ignition failures in an internal combustion engine having a cylinder containing a combustion chamber, an exhaust valve and an exhaust piping system connected to said exhaust valve, said apparatus comprising:

pressure gradient sensor means (10) located downstream of said exhaust valve, in a manner exposed to pressure gradients of pressure waves passing from said exhaust valve and downstream therefrom in said exhaust piping system, for sensing pressure shock waves generated by opening of said exhaust valve, and an evaluation stage (12) electrically connected to said pressure gradient sensor means and having means for detecting and reporting pressure wave deficiency relating to the opening of said exhaust valve.

9. The apparatus of claim 8, wherein said pressure gradient sensor means (10) is connected through a gas pressure wave transmission tube (8) to said exhaust piping system for decoupling said pressure gradient sensor means from mechanical noise conducted by the solid structure of said exhaust piping system, said pressure wave transmission tube (8) being connected at one end to said exhaust piping system and at its other end to said pressure gradient sensor means (10).

10. The apparatus of claims 8, wherein means are provided, responsive to detection of a pressure wave deficiency by said evaluation stage, for shutting off supply of fuel to said cylinder.

11. The apparatus of claim 2, wherein said acoustic wave sensor (10) is mounted so as to respond to pressure gradients of acoustic waves in said collecting tube (6) of said exhaust manifold (4).

12. The apparatus of claim 2, wherein said acoustic wave sensor (10) is connected by a gas pressure wave transmission tube (8) to the space inside said collecting tube (6) of said exhaust manifold (4) for decoupling said acoustic wave sensor (10) from mechanical noise transmitted in the solid structure of said exhaust manifold (4).

13. The apparatus of claim 2, further comprising means for making the output of said acoustic wave sensor available to said evaluation stage only at time intervals including the opening of a said exhaust valve, and means for determining said time intervals under control of a rotary shaft of said engine.

14. The apparatus of claim 2, wherein said evaluation stage is equipped with means for identifying the cylinder to which each reported pressure wave deficiency is related.

15. The apparatus of claim 14, wherein means are provided for shutting off fuel injection to a said cylinder designated by said identifying means as related to a said pressure wave deficiency.

16. Apparatus for detecting ignition failures in an internal combustion engine having a cylinder containing a combustion chamber, an exhaust valve and an exhaust piping system connected to said exhaust valve, said apparatus comprising:

a acoustic wave sensor, constructed as a microphone (10), located downstream of said exhaust valve in a manner exposed to pressure gradients of acoustic waves passing from said exhaust valve and downstream therefrom in said exhaust piping system, for sensing pressure shock waves generated by opening of said exhaust valve, and an evaluation stage (12) electrically connected to said acoustic wave sensor and having means for detecting and reporting an acoustic wave deficiency relating to the opening of said exhaust valve.

17. The apparatus of claim 16, wherein said acoustic wave sensor (10) is connected through an acoustic wave transmission tube (8) to said exhaust piping system for decoupling said acoustic wave sensor from mechanical noise conducted by the solid structure of said exhaust piping system, said acoustic wave transmission tube (8) being connected at one end to said exhaust piping system and at its other end to said acoustic wave sensor (10).

18. The apparatus of claims 16, wherein means are provided, responsive to detection of a acoustic wave deficiency by said evaluation stage, for shutting off supply of fuel to said cylinder.

* * * * *